Figure 1:
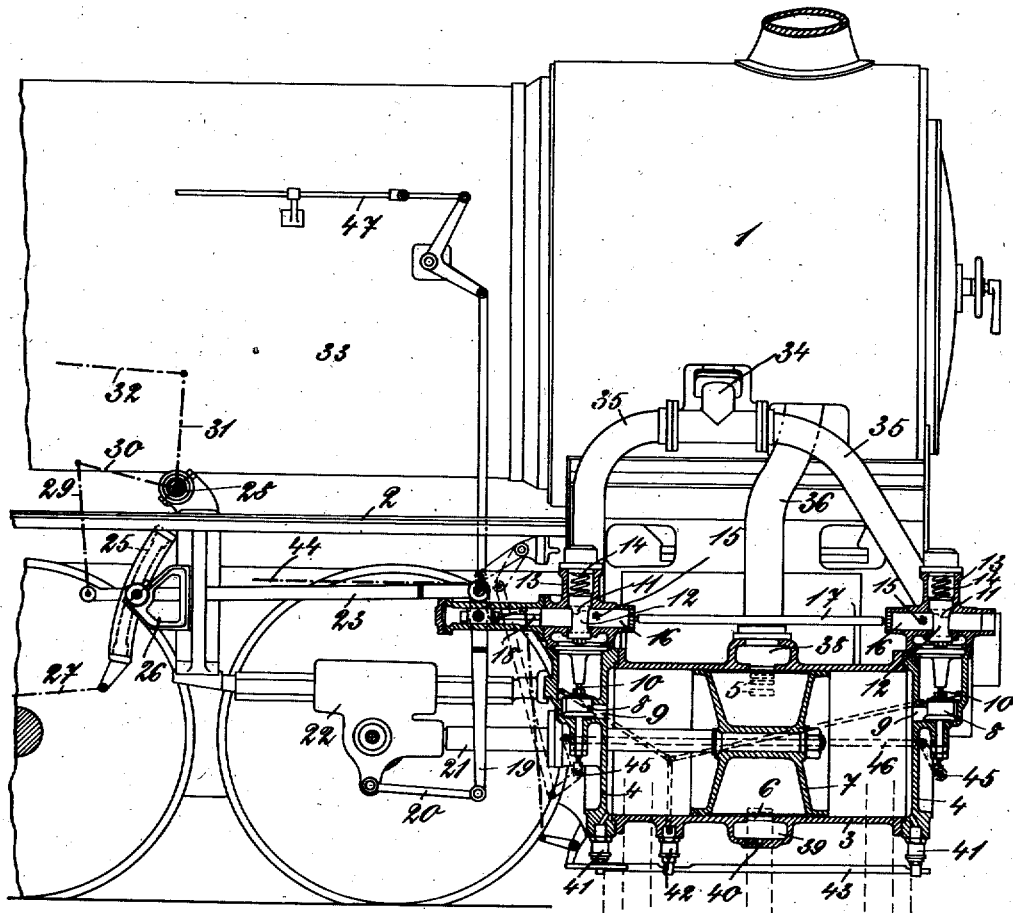

J. STUMPF.

STEAM ENGINE.

APPLICATION FILED AUG. 25, 1909.

Reissued Jan. 3, 1911.

13,191.

2 SHEETS—SHEET 1.

Witnesses:
Flora Greenwald.
Alfred Lyons

Inventor:
Johann Stumpf.
by: L. K. Bohm,
Attorney.

J. STUMPF.

STEAM ENGINE.

APPLICATION FILED AUG. 25, 1909.

Reissued Jan. 3, 1911.

13,191.

2 SHEETS—SHEET 2.

Witnesses:
Flora Greenwald.
Alfred Lyons.

Inventor:
Johann Stumpf.
by: L. K. Bohn,
Attorney.

UNITED STATES PATENT OFFICE.

JOHANN STUMPF, OF BERLIN, GERMANY.

STEAM-ENGINE.

13,191. Specification of Reissued Letters Patent. Reissued Jan. 3, 1911.

Original No. 908,624, dated January 5, 1909, Serial No. 427,768. Application for reissue filed August 25, 1909. Serial No. 514,560½.

*To all whom it may concern:*

Be it known that I, JOHANN STUMPF, a citizen of the Empire of Germany, residing at Berlin, have invented certain new and useful Improvements in Steam-Engines, more particularly to the Locomotive Type, of which the following is a full, clear, and exact description.

This invention relates to steam engines more particularly to locomotive steam engines of the type wherein the exhaust steam escapes through ports in the wall of the cylinder which are controlled or uncovered by the piston.

The object of the invention is to overcome the disadvantageous effect on the steam distribution which results from utilizing the same ports alternately for admitting steam to the cylinder and exhausting it therefrom.

In existing steam engines with known types of valves and valve gear the passage of the exhaust steam through the same ports through which it was admitted to the cylinder results in great variation in the "lead" and compression. This causes large losses in efficiency owing mainly to insufficient compression when there is a late cut-off and the cylinder is filled with steam and in the case of an early cut off owing to excessive compression due to early closing of the exhaust. These losses are avoided by the exhaust being controlled exclusively by the movement of the piston.

In a double acting steam engine having exhaust ports situated about the center of the cylinder and controlled by the piston if the clearance be given normal dimensions the compression with a late cut off and high speed under certain circumstances may become so great as to burst the cylinder or blow off its cover. It is therefore necessary either to arrange suitably controlled auxiliary exhaust ports at the ends of the cylinder or to provide the inlet ports at the ends of the cylinder with non-return valves so that in the event of excessive compression occurring a portion of the compressed steam may be able to return to the boiler. The first of these arrangements would neutralize the chief advantage as regards "lead" and compression which is sought to be obtained in providing a double acting steam engine with exhaust ports controlled by the piston. The provision of inlet ports which are on occasion also used as exhaust ports is on the other hand combined with serious drawbacks more particularly in locomotive engines. In consequence of a portion of the compressed steam being returned to the boiler heavy thermodynamic losses are brought about while moreover there is the possibility of smoke being drawn into the cylinder with the resultant risk of burning the lubricating oil, depositing soot in the cylinder and fracturing it. This danger from smoke is more particularly to be feared when the throttle is closed and the pressure in the steam supply pipe reduced.

According to this invention the above mentioned drawbacks are obviated more especially in double acting locomotive engines by the inlet ports being used exclusively for the admission of steam and by their being positively controlled or operated by means of suitable valve gear of link or other type capable of reversing. Further the cylinder and piston are suitably shaped to provide a clearance which will accommodate the steam remaining in the cylinder after the exhaust ports are closed so that it is unnecessary to arrange for the steam admission ports to be capable of occasional use as exhaust ports.

An engine with valves and gear constructed in accordance with this invention is illustrated in the accompanying drawings by way of example as applied to a locomotive.

Figure 4:
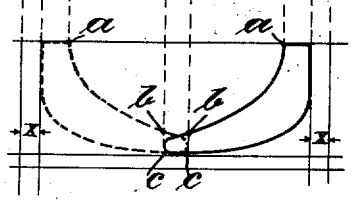
Figure 3:
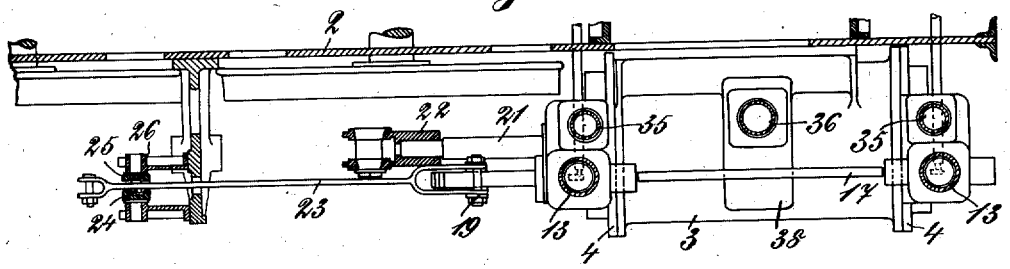
Figure 2:
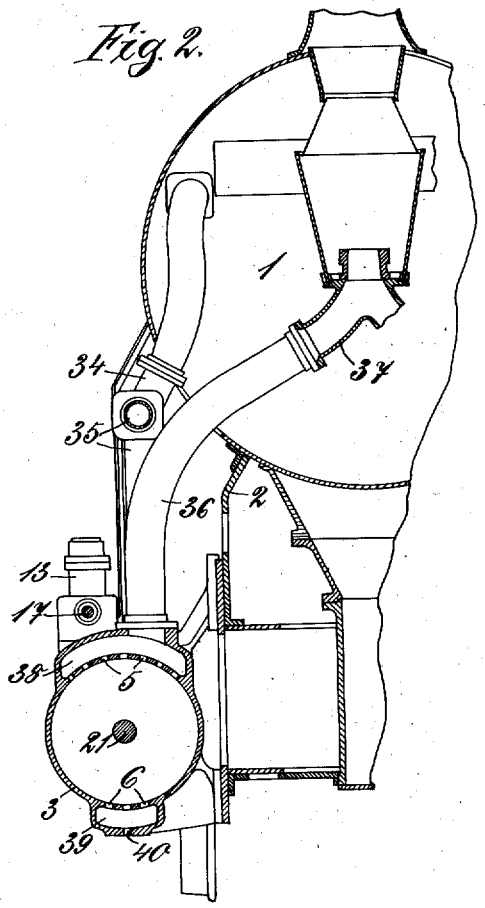

Figure 1 is a somewhat diagrammatic view of the front portion of a locomotive showing a cylinder in longitudinal vertical section. Fig. 2 is a broken cross section through one side of the locomotive the section being taken midway in the length of the cylinder. Fig. 3 is a plan of Fig. 2 partly in section with the boiler removed. Fig. 4 is an indicator diagram illustrative of the operation of the improved engine.

Below the smoke box 1 on the frame 2 is mounted the cylinder 3 provided with covers 4. The cylinder 3 has exhaust ports 5 and 6 formed about its center these ports being intended exclusively for the steam exhausted from the cylinder and being controlled by the piston 7 which covers and uncovers them in its reciprocations. The piston 7 has concave ends, which with the substantially flat or less convexed inner face of the cylinder cover provide a sufficient clearance space at the end of the piston stroke, without necessitating increase of the length of the cylinder for this purpose. Within the cylinder covers 4 are arranged valves 8 controlling the passages communicating with the cylinder by ports 9 these ports, passages and valves being exclusively employed for the admission of live steam. The valves 8 are operated by rollers 15 on a common rod or spindle, the valve spindles 10 being operated by cams 11 by means of sleeves or guide blocks 12 which are disposed in cylindrical caps or casings 13 mounted on the cylinder covers 4, the valves being controlled by adjustable springs 14. The cams 11 coöperate with rollers 15 carried on slides 16 connected by a spindle 17, the slides reciprocating in the caps 13. The reciprocation of the valve spindle 17 with the guide blocks 16 necessary to effect the operation of the inlet apparatus 8 may be effected by means of any known valve gear with eccentrics and link motion or other arrangement adapted to enable reversal to be effected. The link motion illustrated is of the Walschaert type and being known need not be here further described. The slide blocks 16 are secured to a rod 18 which is pivotally connected to the upper end of a two armed lever 19 the lower end of which is pivotally connected by a link 20 to the cross head 22 of the piston rod 21. At the upper end there is pivoted to the lever 19 a rod 23 which carries a slide block 24 adjustable in a radius link 25. The link 25 is centrally pivoted on a bracket 26 mounted on the frame 2 of the locomotive and is caused to oscillate in the well known manner by means of an eccentric rod 27 connected to its lower end. The end of the rod 23 which extends beyond the radius link 25 is connected by a link 29 with a bell crank lever 30, 31 moving on a fulcrum 28, a rod 32 from the arm 31 of this lever extending to the cab and enabling the driver to alter the gear so as to vary the cut off and reverse the engine. Live steam is supplied to the valves 8 from the boiler 33 through pipes 35 branching from a T-piece 34, the steam being delivered to the valves in this way so as to heat the cylinder covers 4.

In accordance with a further feature of this invention the cylinder 3 is constructed as hereinafter described so that hammering due to the presence of water in the cylinder is avoided, this hammering frequently occurring in locomotive engines by reason of the cylinder constituting the lowest point in the apparatus, since the live steam pipes 35 run from the boiler 33 which is situated on a level well above the cylinder, the exhaust pipe 36 also having to be carried upward through the smoke box 1 to the blast pipe 37. With this object the exhaust ports controlled by the piston 7 are divided into two groups disposed respectively on the upper and lower sides of the cylinder 3. The ports 5 of the upper group open into a chamber 38 mounted on the cylinder 3 and communicating with the main exhaust pipe which leads to the blast pipe 37. The ports 6 of the lower group communicate with a second outlet conveniently constituted by a chamber 39 on the underside of the cylinder 3, the bottom of this chamber being provided with a comparatively small opening 40 communicating with the atmosphere. The dimensions of the lower exhaust ports 6 are so calculated that it is not possible for the whole of the exhaust steam to escape through them so that the necessary blast from the pipe 37 is always insured.

When the exhaust ports 5 and 6 are uncovered by the piston the greater portion of the exhaust steam will pass through the ports 5 and the pipe 36 to the blast pipe 37 a smaller portion of the exhaust steam passing through the ports 6 into the chamber 39 and carrying with it any water of condensation which is free to escape through the outlet 40. The chamber 39 constitutes at the same time a water pocket and is for that reason made fairly large so as to enable it temporarily to take up large quantities of water of condensation such as are liable to be formed when the engine is being started. In addition to the outlet 40 there are of course provided for draining the cylinder 3 and the covers 4 the usual cylinder cocks 41 which can be opened by the driver from the cab when required by means of rods 43, 44 these cocks being operated simultaneously with a cock 42 which is provided for draining the steam chambers formed in the cylinder covers 4. When running down hill the valves 8 are held open by means of mechanism described in my co-pending application, Ser. No. 544,733. This mechanism is indicated by the rotatable members 45 which are articulated together by a link 46 and are operable from the engine cab by means of the rod 47.

The operation of the improved construction is as follows:—When the lever 10 is operated by the action of the cross head 22 and radius link 25 so as to move the valve spindle 17 in a forward direction from the position shown in Fig. 1 the valve 8 at the front end of the cylinder will be opened by the corresponding roller 15 meeting and lifting the cam 11, the valve 8 at the other end of the cylinder however remaining closed under the action of its spring 14. On the return movement of the spindle 17 the valve 8 at the forward end of the cylinder is closed while the valve at the rear end of the cylinder is opened by the coresponding roller 15 raising its cam 11. On one of the valves 8 being opened live steam enters the cylinder through the port 9, the piston 7 at the end of its travel in either direction owing to its concave ends leaving between it and the covers 4 a clearance indicated at *x* in the indicator diagram shown in Fig. 4. The dimensions of this clearance are calculated so as to insure that even in the case of late cut off that steam which fails to escape through the exhaust ports 5 and 6 can not be compressed to an injurious extent on the return stroke of the piston.

Referring to the indicator diagram shown the cut off takes place at *a* followed by expansion up to the point *b* when the exhaust ports 5 and 6 are simultaneously uncovered by the piston 7 whereupon the greater portion of the exhaust steam escapes through the pipe 36 to the blast pipe 37 while a lesser portion finds its way into the chamber 39 and so to the atmosphere through the outlet 40 carrying with it at the same time into the chamber 39 any water of condensation which may have been present in the cylinder. On the return stroke of the piston 7 the exhaust ports 5 and 6 are again covered at the point *c* so that the outlet 40 and the exhaust pipe 36 are only in communication with the interior of the cylinder while exhaust is taking place. The piston is given the dimensions necessary to prevent the parts 5 and 6 being uncovered except at the desired time.

If by varying the position of the radius rod 23 in the link 25 by means of the rod 32 and lever 30, 31 the cut off is altered or the engine reversed then owing to the exhaust ports being controlled by the piston 7 the "lead" and compression will still remain constant. In this way all the drawback in working due to the variation in the compression and "lead" are obviated. Owing to the compression being maintained constant the forces resulting from the moving masses of the parts of the engine are always properly taken up so that knocking of the mechanism is effectively avoided whether in going up hill with a late cut off or when going at high speed when the cut off must also be fairly late to overcome air resistance.

The arrangement of double exhaust herein described is particularly applicable to locomotive engines in which the main part of the exhaust is employed for assisting the chimney draft, or for feed heating purposes. Owing to the construction of locomotives, it is impossible to lead the exhaust from the bottom of the cylinders, or such a construction is associated with considerable difficulty. By arranging a separate draining exhaust, as described, only low pressure steam escapes through the draining passage 40, and all the advantages of leading the exhaust from the bottom of the cylinder are secured.

What I claim is:—

1. In a steam engine, the combination of a cylinder, a piston therein, a steam inlet port at the end of the cylinder, a valve controlling the passage of steam through said port, means for operating said valve, a group of exhaust ports in the upper side of the cylinder and a group of exhaust ports in the under side of the cylinder, the total area of the lower group of ports being less than the total area of the upper group of ports, all of said ports being covered and uncovered by the piston in its travel, and each group of ports communicating with a separate exhaust passage, substantially as described.

2. In a steam engine the combination of a cylinder, a piston therein whose travel and form are so proportioned relatively to the cylinder as to provide a clearance whose volume is equivalent to the least volume into which the residual exhausted steam is to be compressed, a steam inlet port at the end of the cylinder, a valve controlling the passage of steam through said port means for operating said valve, a group of exhaust ports in the upper side of the cylinder, a group of exhaust ports in the under side of the cylinder, the total area of the lower group of ports being less than the total area of the upper group of ports, all of said ports being covered and uncovered by the piston in its travel, an exhaust pipe with which the upper group of ports communicates, and a separate chamber on the underside of the cylinder with which the lower group of ports communicates, said chamber being provided with a relatively small outlet, substantially as described.

3. In a locomotive steam engine, the combination of a cylinder having a steam inlet port at the end thereof and separate exhaust ports leading therefrom, a valve controlling the passage of steam through said inlet port, a working piston in said cylinder controlling said exhaust ports, a main exhaust pipe leading from said cylinder in a usual manner, and an additional drain exhaust opening leading from the lower part of said cylinder, for the purpose set forth.

4. In combination, a cylinder having a steam inlet at its end and separate exhaust ports, a piston adapted to overrun and control said exhaust ports at and near the end of its stroke, said piston being provided with a concave end and a cover on said cylinder having a substantially flat inner face.

In witness whereof I have hereunto set my hand in presence of two witnesses.

JOHANN STUMPF.

Witnesses:
MAX SEILER,
P S. H. ALEXANDER.